(12) United States Patent
Whitmore, Sr.

(10) Patent No.: US 7,776,275 B2
(45) Date of Patent: Aug. 17, 2010

(54) CHEMICAL FEEDER SYSTEM AND METHOD

(76) Inventor: Brian S. Whitmore, Sr., 3505 Mirror Ct., Spring, TX (US) 77388

( * ) Notice: Subject to any disclaimer, the term of this patent is extended or adjusted under 35 U.S.C. 154(b) by 119 days.

(21) Appl. No.: 11/472,886

(22) Filed: Jun. 22, 2006

(65) Prior Publication Data

US 2006/0289363 A1 Dec. 28, 2006

Related U.S. Application Data

(60) Provisional application No. 60/693,174, filed on Jun. 23, 2005.

(51) Int. Cl.
*G05D 16/00* (2006.01)
*G05D 11/00* (2006.01)
*B01D 15/00* (2006.01)

(52) U.S. Cl. .................... 422/110; 422/111; 210/198.1; 210/258; 137/87.01; 137/101.19

(58) Field of Classification Search ................. 422/110, 422/111; 210/198.1, 101, 258; 137/87.01, 137/101.19
See application file for complete search history.

(56) References Cited

U.S. PATENT DOCUMENTS 5,827,959 A * 10/1998 Clanin .......................... 73/198
2002/0170853 A1 * 11/2002 Alexander ................... 210/169

* cited by examiner

*Primary Examiner*—Walter D Griffin
*Assistant Examiner*—Lessanework Seifu
(74) *Attorney, Agent, or Firm*—Winstead PC; Henry L. "Bud" Ehrlich

(57) ABSTRACT

A chemical feeder system includes an aqueous chemical contained in a chemical source, the chemical source connected with a fluid stock through a chemical flow conduit and a feeder assembly connected within the chemical flow conduit that includes a metering device, a flow rate sensor and a controller operationally connected between the flow rate sensor and the metering device. A method of controlling the flow rate a treating chemical is applied to a fluid stock includes the steps of positioning a flow sensor upstream of a chemical metering device in a chemical flow conduit between a chemical source and fluid stock, flowing a treating chemical from the source through the chemical flow conduit, determining a desired application flow rate of the treating chemical and adjusting the metering device in response to a flow rate reading at the flow rate sensor to achieve the desired application flow rate.

11 Claims, 2 Drawing Sheets

CHEMICAL FEEDER SYSTEM AND METHOD

RELATED APPLICATIONS

This application claims the benefit of U.S. Provisional Patent Application No. 60/693,174 filed Jun. 23, 2005.

FIELD OF THE INVENTION

The present invention relates in general to metering systems and in particular to a chemical feeder system for metering a desired chemical rate to a fluid stock.

BACKGROUND

Various systems for feeding aqueous chemicals under a vacuum exist. Commonly, these prior art systems utilize a venturi to create a vacuum. The vacuum draws a neat chemical through a calibrated glass tube and V-notch. The glass tube is utilized as an indication tool, wherein the V-notch is aligned with the calibration marks to control the flow rate through the metering device.

There are numerous drawbacks to these prior art vacuum systems relating to accuracy, operation and control. One drawback is that the calibration is determined for specific chemicals and their properties at standard conditions. Thus, if the chemical properties vary from those related to the calibration points the metered rate will be inaccurate, and these glass tube, V-notch devices will not indicate the inaccuracy. For example, changes in the chemical's specific gravity from that utilized for the calibration can result in significant metering inaccuracy.

Another drawback is when unstable chemicals, such as sodium hypochlorite, have gas breakout. The gas can become trapped in the V-notch device preventing proper operation of the metering device. Similar problems exist with the current systems when debris or entrained gasses exist in the chemical feed stream. Again, the failure of the metering device will often go unnoticed until an operator visually checks the glass tube or a failure downstream in the fluid treatment system is noted.

Another drawback of the present vacuum metering systems is the requirement for vacuum regulation systems. As the differential suction head changes, e.g. as the chemical level in the storage tank changes, chemical flow rate will change unless the differential head is addressed.

Therefore, it is a desire of the present invention to provide a vacuum chemical metering system that addresses drawbacks of the current vacuum chemical metering devices. It is a still further desire to provide a chemical metering device that controls the chemical dose fed to a fluid stock based on the actual flowing conditions of the chemical.

SUMMARY OF THE INVENTION

Accordingly, metering systems and methods for applying a treating chemical at a desired flow rate to a fluid for treating the fluid is provided. An embodiment of the chemical feeder system includes an aqueous chemical contained in a chemical source, the chemical source connected with a fluid stock through a chemical flow conduit and a feeder assembly connected within the chemical flow conduit that includes a metering device, a flow rate sensor and a controller operationally connected between the flow rate sensor and the metering device.

An embodiment of a method of controlling the flow rate a treating chemical is applied to a fluid stock includes the steps of positioning a flow sensor upstream of a chemical metering device in a chemical flow conduit between a chemical source and fluid stock, flowing a treating chemical from the source through the chemical flow conduit, determining a desired application flow rate of the treating chemical and adjusting the metering device in response to a flow rate reading at the flow rate sensor to achieve the desired application flow rate.

An embodiment of a chemical feeder assembly that is connectable within a fluid treatment system for applying a controlled flow rate of a treating chemical to a fluid stock includes a metering assembly including a flow rate sensor and a metering device interconnected to form a chemical flow path between a chemical inlet and a chemical outlet, the flow rate sensor positioned upstream of the metering device in the chemical flow path and a processor operationally connected to the flow rate sensor and the metering device, the processor adjusting the metering device in response to a flow rate reading at the flow rate sensor to achieve a desired application flow rate of a treating chemical through the chemical flow path.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1:
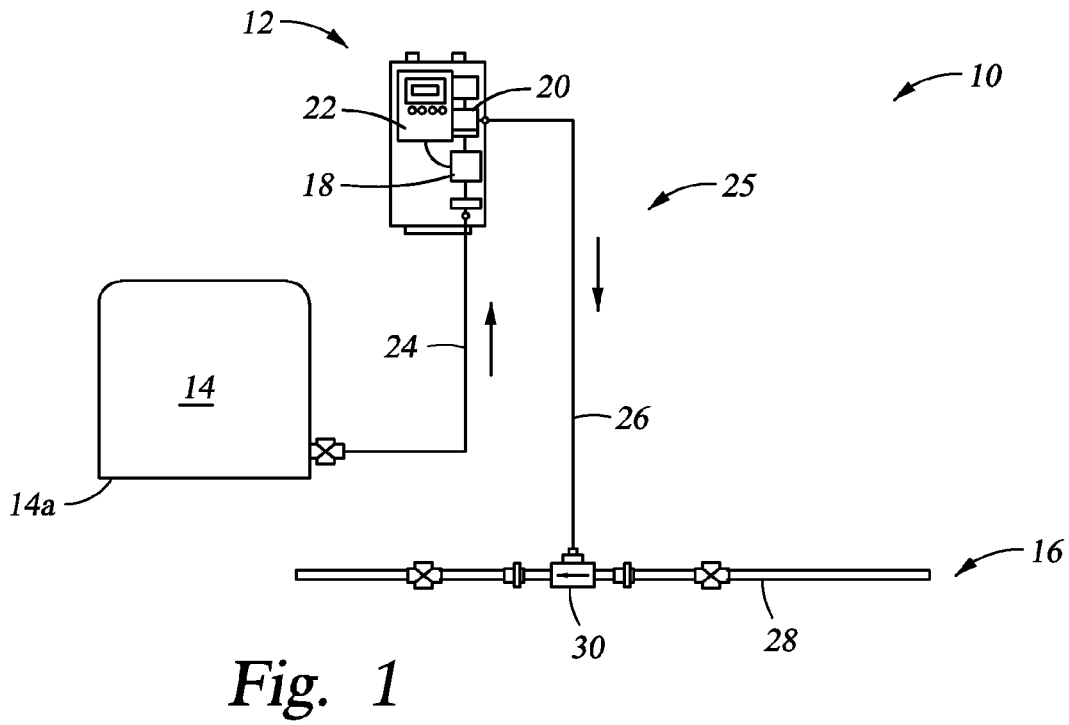
FIG. 1 is a schematic of an embodiment of the chemical feeder system of the present.

Refer now to the drawings wherein depicted elements are not necessarily shown to scale and wherein like or similar elements are designated by the same reference numeral through the several views.

FIG. 1 is a schematic of an embodiment of the chemical feeder system of the present, generally denoted by the numeral 10. Feeder system 10 includes a chemical feeder assembly 12 connected between a chemical 14 stored in a vessel 14a (together referred to herein as chemical 14 source) and a fluid stock 16. For purposes of illustration, fluid stock 16 is a waste water requiring chemical treatment. Chemical 14 may be any chemical that is required for treatment of fluid stock 16. Examples of chemicals 14 include, but are not limited to, hypochlorite, sodium bisulfite, ammonium sulfate, ammonia (ammonium hydroxide, sodium hydroxide, aqueous aluminum sulfate, aqueous copper sulfate, hydrochloric acid and hydrofluorosilicic acid.

Feeder assembly 12 includes a flow rate sensor 18, metering device 20 and controller 22 for feeding chemical 14 at a desired rate to fluid stock 16. Controller 22 is operatively connected to metering device 20 and flow rate sensor 18 to maintain a desired feed rate of chemical 14 to fluid stock 16.

Feeder assembly 12 is connected to chemical 14 source by an inlet conduit 24 and to fluid stock 16 through an outlet conduit 26. Outlet conduit 26 is connected to a feed stock conduit 28 via an ejector 30. As fluid stock 16 flows through conduit 28 and ejector 30 a vacuum is created drawing fluid through conduits 24, 26 and feeder assembly 12. Feeder system 10 may further include various vacuum regulator, boosters or other devices as need for the particular application.

Figure 2B:
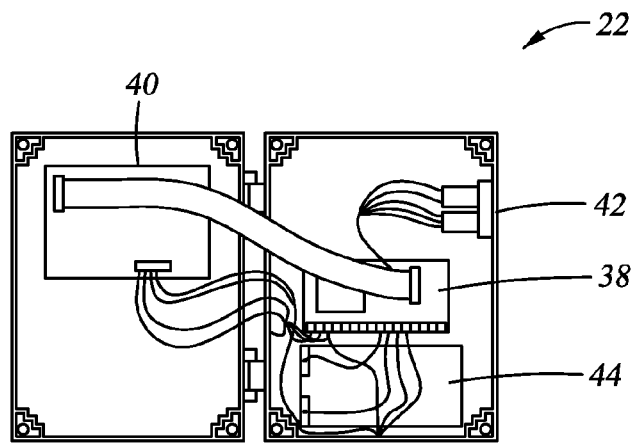
FIG. 2B is an expanded view of an embodiment of the controller of FIG. 2A.
Figure 2A:
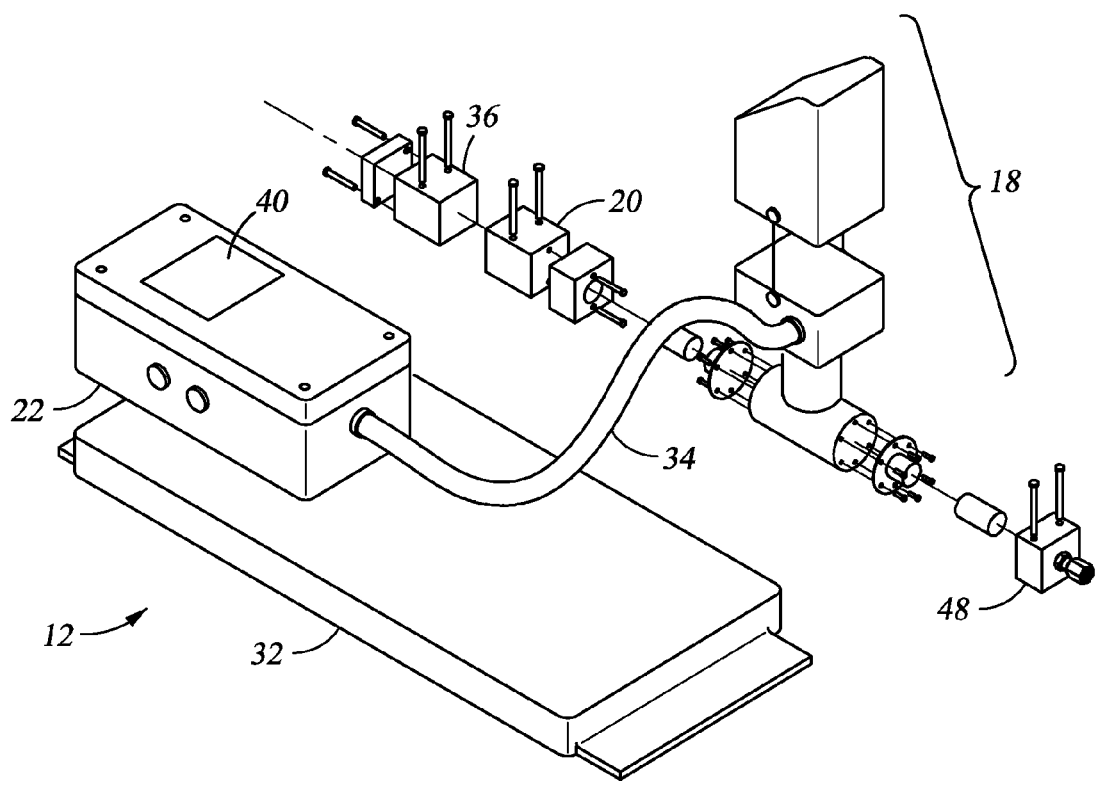
FIG. 2A is an exploded view of an embodiment of a chemical feeder assembly of the present invention.

Refer now to FIG. 2A wherein an exploded view of chemical feeder assembly 12 is provided. Feeder assembly 12 may be mounted on a panel 32 for convenience and ease of installation in a fluid treatment system. Controller 22 is operatively connected to flow rate sensor 18 via electrical lines 34.

A motor 36 is connected to metering device 20 to operate metering device 20 and adjust the control rate of the chemical to the fluid stock in response to signals from controller 22. Metering device 20 is connected to controller 22 as illustrated in FIG. 2B. With reference to FIG. 1, it should be noted that flow rate sensor 18 is positioned upstream of metering device 20 in the chemical flow path 25 from chemical 14 source to fluid stock 16. The portion of feeder assembly 12 from motor 36 to inlet conduit 24 is referred to generally herein as metering assembly 46.

Flow rate sensor 18 in the illustrated embodiments is a magnetic flow meter (MFM). Flow rate sensor 18 monitors the chemical flow rate through flow rate sensor 18 and provides an electronic signal to controller 22 of the chemical flow rate. With flow rate sensor 18 positioned upstream of metering device 20, controller 22 can accordingly control metering device 20 in response to the actual flow rate of chemical 14.

Refer now to FIG. 2B, wherein an expanded internal view of an embodiment of controller 22 is illustrated. Controller 22 includes at least one processor 38, desirably including a display 40. A keyboard, keypad, touch screen or other like means (not shown) is provided or connectable with processor 38 for user input of information. Processor 38 is operatively connected to motor 36 (FIG. 2B) via connector 42. Processor 38 is connected to an appropriate power source 44, shown as a battery herein.

Figure 3:
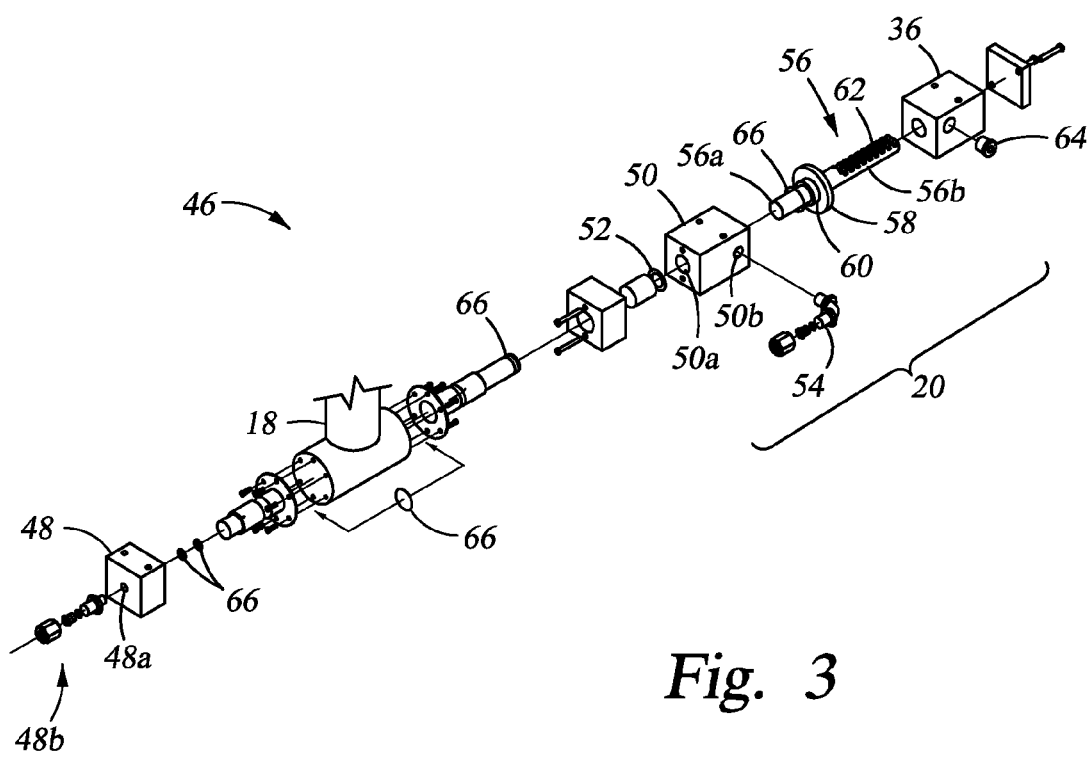
FIG. 3 is an exploded view of an embodiment of a metering assembly of the present invention.

FIG. 3 is an exploded view of an embodiment of metering assembly 46. FIG. 3 is now described with reference to FIG. 1. Chemical 14 inlet conduit connects to inlet body 48 forming inlet bore 48a. An inlet connector 48b is provided for connecting chemical inlet conduit 24 to metering assembly 46. Flow rate sensor 18, having a bore 18a, is connected between inlet body 48 and metering device 20. Metering device 20 is a V-notch type metering device having a body 50 defining an orifice 52 which may be formed of a material such as PTFE. Body 50 forms a bore 50a fluid connection with bores 18a and 48a and a chemical discharge outlet 50b. A connector 54 is provided for connecting fluid outlet conduit 26 to metering assembly 46 through discharge outlet 50b. As should be noted chemical flow path 25 extends from inlet 48a to discharge outlet 50b.

Metering Device 20 includes a shaft 56 having a first end 56a functionally mated with body 50 and orifice 52 and a second end 56b functionally connected with motor 36. Shaft 56 is connected in a fluid sealed manner to body 50 such as by a clamping screw 58 having a collar seal 60 constructed of a suitable material such as TFE. Second end 56b of shaft 56 includes teeth 62 functionally connected to control shaft 64 of motor 36 in a manner such that second end 56a can be moved relative to orifice 52 controlling the flow of chemical 14 to fluid stock 16. The various elements may be interconnected with suitable means such as screws, bolts, flanges, and/or welding. Sealing members 66, such as O-rings and gaskets, suitable for use with chemical 14 may be included.

Operation of chemical feeder system 10 of the present invention is now described with reference to FIGS. 1 through 3. Chemical feeder assembly 12 is connected via conduits 24, 26 between a fluid 16 to be treated and a treating chemical 14. Feeder assembly 12 is connected to a panel 32 that is oriented substantially vertical relative to ground level. Feeder assembly 12 is leveled. The desired chemical dose, or flow rate, is selected for fluid 16 to be treated and the dose is input into processor 38. Metering device 20 is actuated to feed the desired chemical 14 dose. It should be noted, in particular in relation to the initial operation of the system, that the chemical flow rate through metering device 20 may be set manually or via controller 22.

System 20 is actuated by flowing fluid stock 16 through conduit 28 and ejector 30 creating a vacuum drawing chemical 14 from vessel 14a through chemical flow path 25. As chemical 14 is drawn through path 25 it passes through flow rate sensor 18. Flow rate sensor 18 measures the chemical flow rate and sends an electronic signal to controller 22. Controller 22 compares the flow rate information with user inputted control instructions for correlation. If the flow rate readings do not correlate with the user instructions, then controller 22 actuates motor 36 and metering device 20 to adjust the chemical flow rate accordingly. As is well known in the art of electronic controllers, numerous user parameters or instructions may be input to dictate the operation of metering device 20.

From the foregoing detailed description of specific embodiments of the invention, it should be apparent that a system for controlling a chemical dose to a fluid that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A chemical feeder system for administering a desired concentration of a treating chemical to a fluid, the system comprising:
    an aqueous chemical contained in a chemical source, the aqueous chemical connected with a flowing fluid stock through a chemical flow conduit; an ejector drawing the aqueous chemical into the flowing fluid stock; and
    a feeder assembly connected within the chemical flow conduit and oriented substantially vertical to ground level, the feeder assembly comprising:
        a metering device comprising a shaft having a collar seal disposed at a first end and a second end connected to a motor, the shaft moveably disposed with an orifice;
        a flow rate sensor positioned upstream of the metering device; and
        a controller operationally connected between the flow rate sensor and the metering device, the controller operable to actuate the shaft in response to a flow rate reading at the flow rate sensor to achieve a desired application flow rate of a treating chemical through the chemical flow path, wherein the aqueous chemical flows in a substantially vertical direction relative to the ground through the flow rate sensor and then through the metering device.

2. The system of claim 1, wherein the aqueous chemical is sodium hypochlorite.

3. The system of claim 1, wherein the aqueous chemical comprises one or more components selected from the group consisting of sodium hypochlorite, sodium bisulfate, ammonium sulfate, ammonium hydroxide, sodium hydroxide, aluminum sulfate, copper sulfate, and hydrochloric acid.

4. A chemical feeder assembly that is connectable within a fluid treatment system for applying a controlled flow rate of a treating chemical to a fluid stock, the assembly comprising:
   a metering assembly including a flow rate sensor and a metering device interconnected to form a chemical flow path between a chemical inlet and a chemical outlet, the flow rate sensor positioned upstream of the metering device in the chemical flow path, wherein the flow path between the chemical inlet and the chemical outlet is oriented substantially vertically relative to the ground;
   the metering device comprising a shaft having a collar seal disposed at a first end and a second end connected to a motor, the shaft moveably disposed with an orifice; and
   a processor operationally connected to the flow rate sensor and the metering device, the processor operable to actuate the shaft within the metering device in response to a flow rate reading at the flow rate sensor to achieve a desired application flow rate of a treating chemical through the chemical flow path.

5. A method for continuously controlling the flow rate of an aqueous chemical drawn in to a flowing fluid stock, the method comprising:
   positioning a feeder assembly in a substantially vertical position relative to the ground, the feeder assembly comprising a flow rate sensor and a metering device forming a flow path between an inlet end and an outlet end;
   drawing an aqueous chemical into the inlet end of the feeder assembly through the flow rate sensor and then the metering device and then into a flowing fluid stock;
   monitoring the flow sensor; and
   adjusting, via an electronic controller, the flow rate of the aqueous chemical through the metering device in response to monitoring the flow sensor.

6. The method of claim 5, wherein the step of monitoring and adjusting is performed while performing the step of drawing the aqueous chemical.

7. The method of claim 5, wherein the metering device includes a shaft functionally connected between a motor and an orifice.

8. The method of claim 5, wherein the flow sensor is a magnetic flow meter.

9. The method of claim 6, wherein the metering device includes a shaft functionally connected between a motor and an orifice.

10. The method of claim 6, wherein the flow sensor is a magnetic flow meter.

11. The method of claim 10, wherein the metering device includes a shaft functionally connected between a motor and an orifice.

* * * * *